United States Patent
Nagase

(12) United States Patent (10) Patent No.: US 7,755,658 B2
Nagase (45) Date of Patent: Jul. 13, 2010

(54) LIGHT BEAM SCANNING APPARATUS WITH ELECTRO-OPTIC CRYSTAL

(75) Inventor: Tetsuya Nagase, Abiko (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/959,992

(22) Filed: Dec. 19, 2007

(65) Prior Publication Data

US 2008/0159785 A1    Jul. 3, 2008

(30) Foreign Application Priority Data

Dec. 28, 2006   (JP) ............................. 2006-355159

(51) Int. Cl.
*B41J 15/14* (2006.01)
*B41J 27/00* (2006.01)

(52) U.S. Cl. ...................... 347/244; 347/256

(58) Field of Classification Search .............. 347/232, 347/236, 241–244, 256–259; 359/216, 244, 359/254, 315, 483, 197.1; 385/2, 8; 372/20
See application file for complete search history.

(56) References Cited

U.S. PATENT DOCUMENTS

| | | | | |
|---|---|---|---|---|
| 4,564,267 A * | 1/1986 | Nishimoto | .................. | 359/483 |
| 4,758,848 A * | 7/1988 | Nakano | ....................... | 347/236 |
| 4,764,776 A * | 8/1988 | Mugrauer et al. | ............ | 347/232 |
| 5,033,806 A * | 7/1991 | Tomita et al. | ................ | 347/256 |
| 5,103,334 A * | 4/1992 | Swanberg | ................ | 359/197.1 |
| 5,587,826 A * | 12/1996 | Shibaguchi | .................. | 359/216 |
| 5,929,979 A * | 7/1999 | Okino et al. | ................... | 355/60 |
| 6,816,516 B2 * | 11/2004 | Daiber | ........................ | 372/20 |
| 7,038,835 B2 * | 5/2006 | Matsuki et al. | .............. | 359/315 |

FOREIGN PATENT DOCUMENTS

| | | | |
|---|---|---|---|
| JP | 56094527 A * | 7/1981 | |
| JP | 58-057108 A | 4/1983 | |
| JP | 04-264420 A | 9/1992 | |
| JP | 06148581 A * | 5/1994 | |
| JP | 2005234004 A * | 9/2005 | |

* cited by examiner

*Primary Examiner*—Hai C Pham
(74) *Attorney, Agent, or Firm*—Rossi, Kimms & McDowell LLP

(57) ABSTRACT

There is provided a light beam scanning apparatus which deflects a light beam from a light source by using a deflector and scans the surface of a photosensitive member with a focused light beam. The light beam scanning apparatus includes a first electro-optical element placed on the optical axis of the light beam between the light source and the deflector. The first electro-optical element includes an electro-optical crystal and transparent electrodes respectively provided on surfaces of the electro-optical crystal which oppose each other in the optical axis direction.

4 Claims, 20 Drawing Sheets

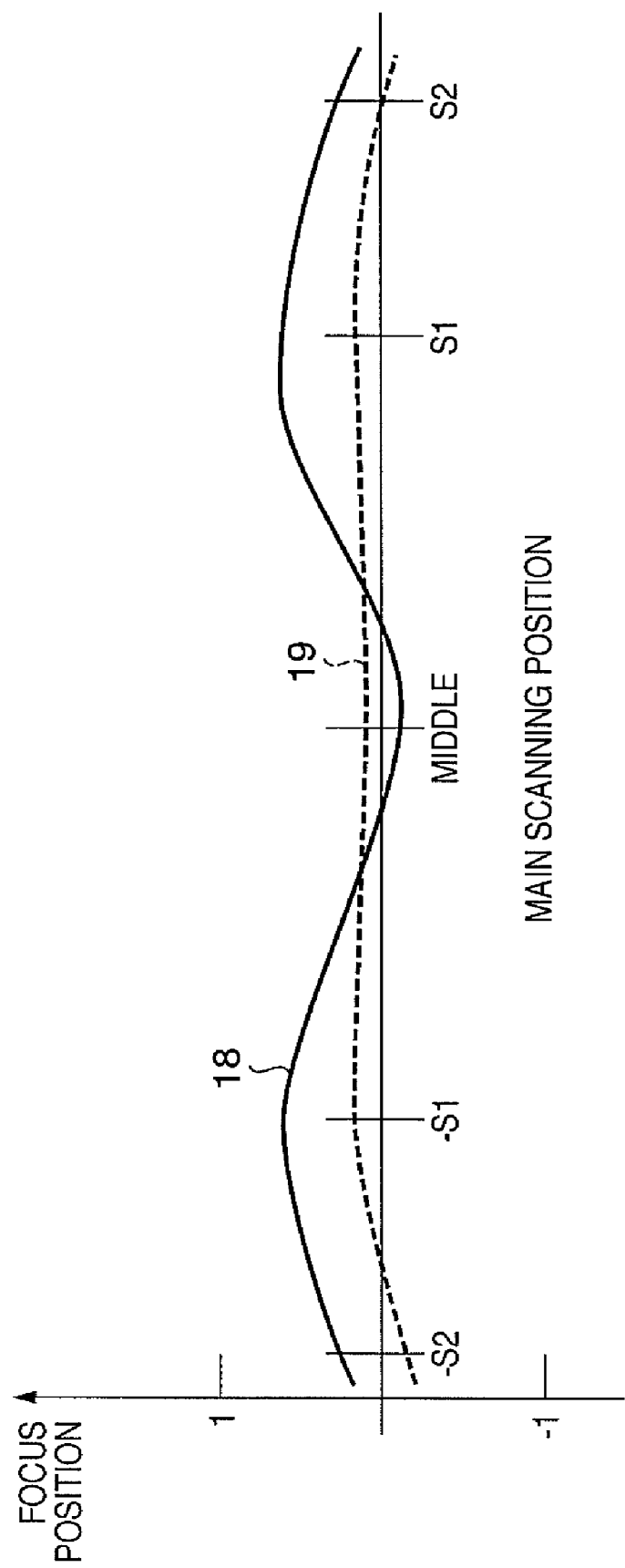

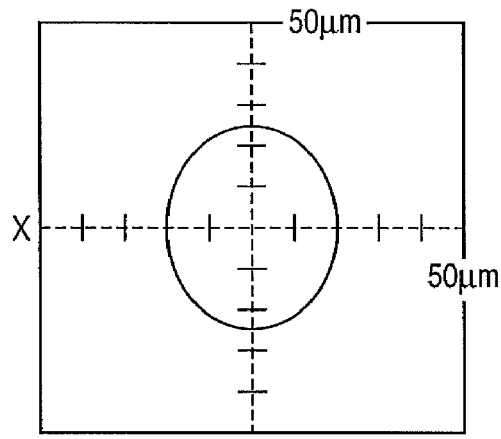
F I G. 10A
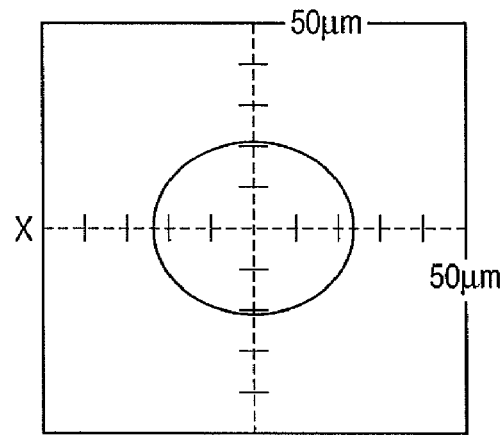
F I G. 10B
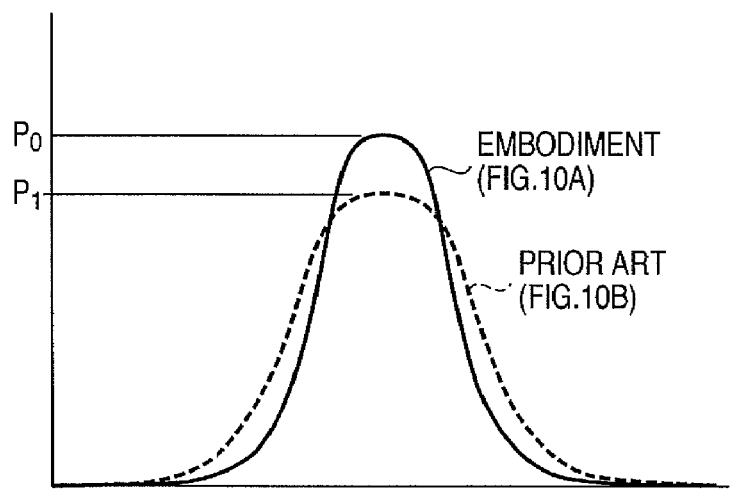
F I G. 10C

F I G. 14B
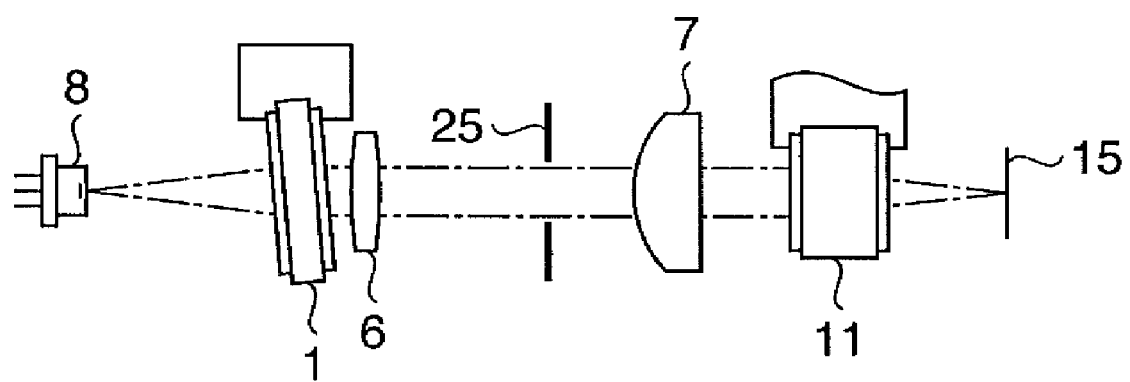

LIGHT BEAM SCANNING APPARATUS WITH ELECTRO-OPTIC CRYSTAL

BACKGROUND OF THE INVENTION

1. Field of the Invention

The present invention relates to a light beam scanning apparatus used for a copying machine, laser printer, or the like.

2. Description of the Related Art

In a laser printer or the like using an electrophotographic method, a charger charges a photosensitive member as an image carrier, and a latent image is formed on the photosensitive member by laser application upon driving a semiconductor laser in accordance with image information. An image is then formed on a sheet or the like by transferring, onto the sheet, a toner image obtained by developing the latent image using the developing agent.

In such a laser printer, a collimator lens converts a laser beam emitted by a semiconductor laser used as a light source into almost parallel light. A deflecting member such as a rotary polyhedral mirror (polygon mirror) deflects the parallel light at a predetermined beam diameter. An f-θ lens then focuses the resultant light. At the same time, the f-θ lens corrects the distortion so as to guarantee the temporal scanning linearity. The laser beam having passed through the f-θ lens is focused and scanned on the photosensitive member in the main scanning direction (axial direction of the photosensitive member) at a uniform velocity. At this time, the surface of the photosensitive member is scanned with a desired spot. A shift in focusing position on the photosensitive member causes degradation of the image quality. An implementation is made to prevent the focusing position (beam waist) of the laser beam from greatly shifting on the photosensitive member. For example, the mechanical precision and arrangement precision of optical components and mechanical components are improved, and the coefficients of linear expansion of these components are optimized.

Conventionally, however, image plane curvature occurs, in which the position of a beam waist meanders in the direction of the optical axis depending on the scanning position of a laser beam on the photosensitive member, or the position of a beam waist varies owing to variations in the relative distance between components due to changes in temperature or owing to changes in refractive index.

Recently, as color laser printers have become popular, there have been increasing demands for the density uniformity of highlighted halftone images.

In a laser printer, in order to properly reproduce a highlighted halftone image, it is necessary to form a small spot with a uniform spot profile on the photosensitive member surface. In addition, it is preferable that the profile of the spot not vary with time.

With regard to such a demand, Japanese Patent Laid-Open No. 58-57108 discloses a technique of improving the image formation characteristic of an optical system by allowing an actuator to move the position of a lens so as to correct the beam waist position of a scanning beam.

According to Japanese Patent Laid-Open No. 4-264420, as shown in FIGS. 18A and 18B, a cylindrical lens 103 intermediately forms a laser beam 111 into an image before it is deflected by a polygon mirror 107, and an electro-optical element 104 is placed at the beam waist portion. According to this proposal, the image formation characteristic of the optical system is improved by applying a voltage to the electro-optical element 104.

As shown in FIG. 19, the electro-optical element 104 has a pair of electrodes 113 made of Au or the like which are arranged on opposing surfaces of an electro-optical crystal 112, and changes the refractive index of the electro-optical crystal 112 by changing the electric field strength by applying a voltage in a direction perpendicular to an optical axis 52 by using a control power supply 110.

The technique disclosed in Japanese Patent Laid-Open No. 58-57108 is inferior in the stability of the positions of optical parts and reproducibility to the technique of fixing optical parts, and is difficult to move the optical parts at high speed. This makes it difficult to correct image plane curvature.

According to the technique disclosed in Japanese Patent Laid-Open No. 4-264420, the refractive index profile produced at the electro-optical element 104 is not constant. For this reason, the uniformity of a latent image is impaired by variations in the light amount profile of a spot on the scanned surface, or a light beam is deflected in accordance with the magnitude of an electric field applied to the electro-optical element 104.

In addition, since an intermediate beam waist portion is formed by the electro-optical crystal 112, a complicated lens arrangement is required.

SUMMARY OF THE INVENTION

It is an object of the present invention to provide a light beam scanning apparatus which can adjust a beam waist position stably at high speed with a simple lens arrangement without causing any variation in the light amount profile of a spot on an image plane.

According to one aspect of the present invention, a light beam scanning apparatus which deflects a light beam from a light source by using a deflector and scans a surface of a photosensitive member with a focused light beam is provided. The apparatus includes a first electro-optical element placed on an optical axis of the light beam between the light source and the deflector. The first electro-optical element includes an electro-optical crystal and transparent electrodes respectively provided on surfaces of the electro-optical crystal which oppose each other in an optical axis direction.

Further features of the present invention will become apparent from the following description of exemplary embodiments with reference to the attached drawings.

BRIEF DESCRIPTION OF THE DRAWINGS

FIG. 8 is a graph showing an example of the measured data of image plane curvature in main scanning and sub scanning;

FIG. 10A is a view showing a spot shape at a beam waist position, FIG. 10B is a view showing a spot shape at a non-beam waist position where the spot changes, and FIG. 10C is a view showing a main scanning section of FIGS. 10A and 10B;

FIG. 14B is a sectional view of an optical path from a semiconductor laser 8 to a polygon mirror 15;

DESCRIPTION OF THE EMBODIMENTS

Various exemplary embodiments, features, and aspects of the present invention will be described in detail below with reference to the drawings.

Figure 1:
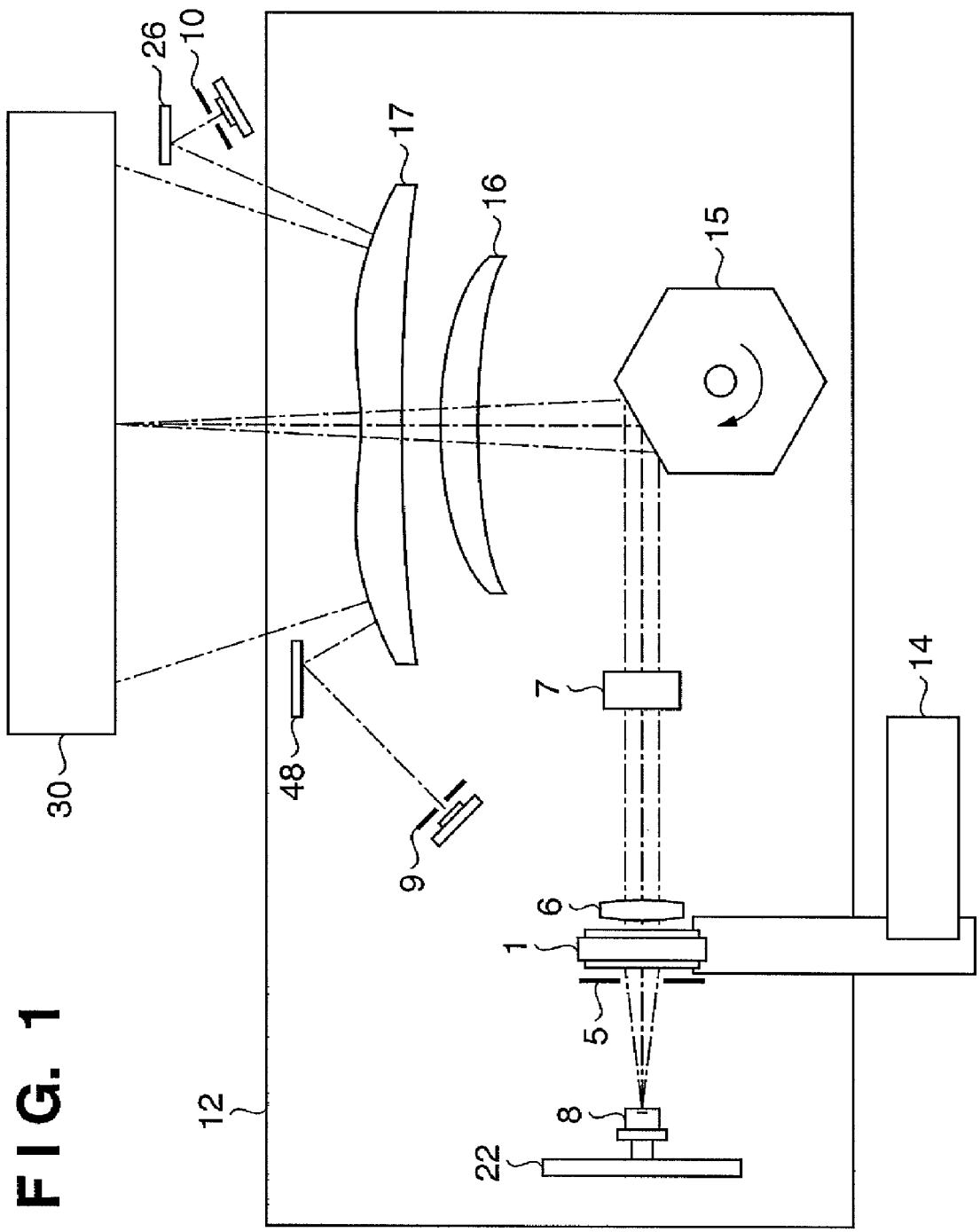
FIG. 1 is a plan view showing the arrangement of a laser (light beam) scanning apparatus according to the first embodiment of the present invention.
Figure 2:
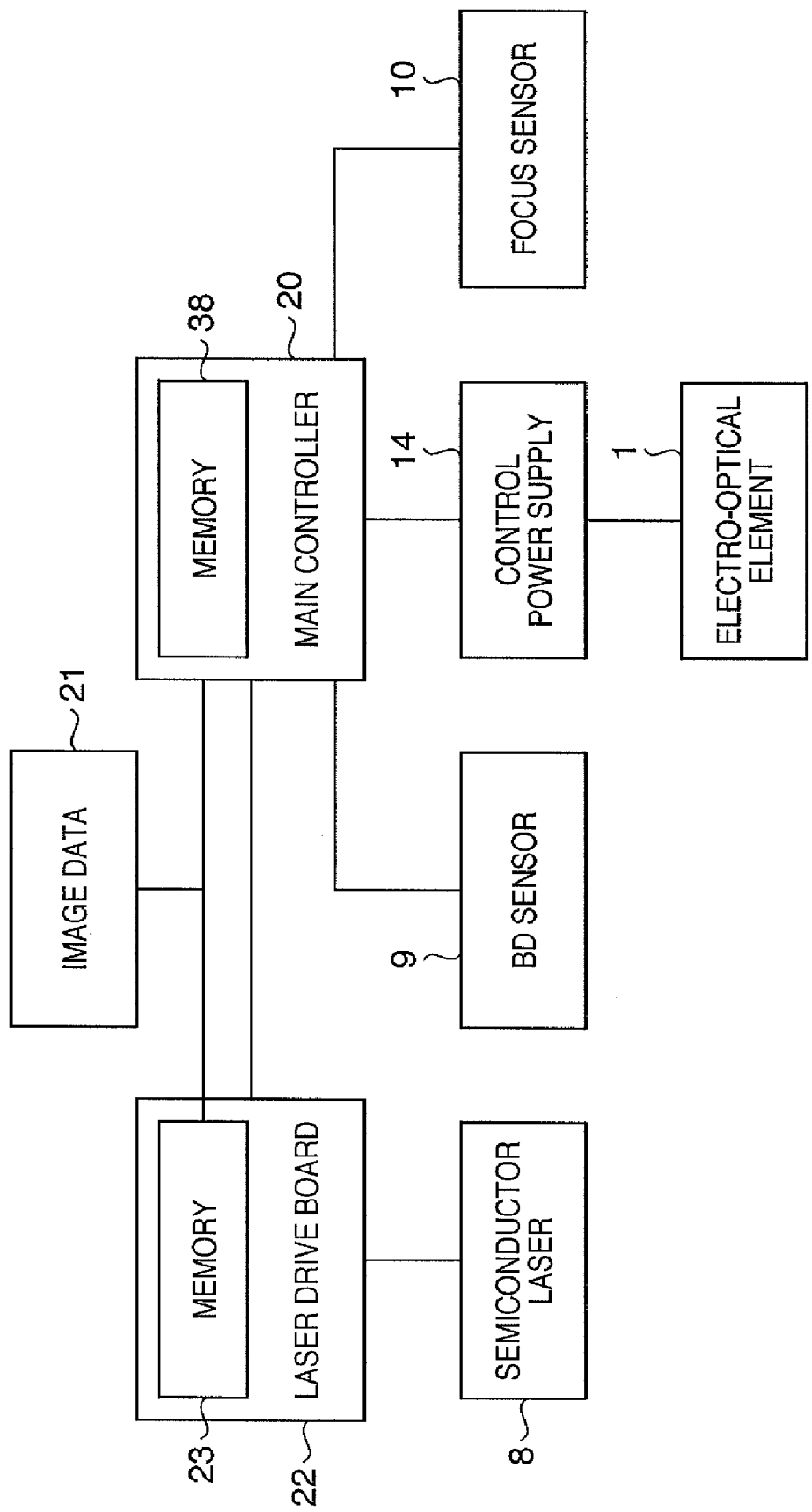
FIG. 2 is a block diagram showing a control mechanism for the laser scanning apparatus shown in FIG. 1.

FIG. 1 is a plan view showing the arrangement of a laser (light beam) scanning apparatus according to the first embodiment of the present invention. FIG. 2 is a block diagram showing a control mechanism for the laser scanning apparatus shown in FIG. 1.

As shown in FIG. 1, a laser drive board 22 drives a laser scanning apparatus 12 to make an aperture 5 limit a laser beam emitted from a semiconductor laser 8, and a collimator lens 6 almost collimates the laser beam transmitted through an electro-optical element 1.

A cylindrical lens 7 focuses the laser beam almost collimated by the collimator lens 6 only in the moving direction (sub scanning direction) of the surface of a photosensitive drum 30. This laser beam is then deflected by a polygon mirror 15 whose rotation is controlled by a motor (not shown) at a constant rotational speed.

The deflected laser beam is then formed into an image on the surface of the photosensitive drum 30 as an image plane by f-θ lenses 16 and 17 as scanning lenses at a uniform velocity and with a predetermined spot diameter. The spot formed on the surface of the photosensitive drum 30 forms an electrostatic latent image upon main scanning by the rotation of the polygon mirror 15 and sub scanning by the rotation of the photosensitive drum 30.

A signal obtained by a beam detector sensor (to be referred to as a BD sensor hereinafter) 9 is used as a reference to the execution of the processing of matching the latent image timings in the main scanning direction for the respective scanning lines at the time of the formation of a latent image on the surface of the photosensitive drum 30. In this case, a mirror 48 separates a laser beam to input it to the BD sensor 9.

Figure 5:
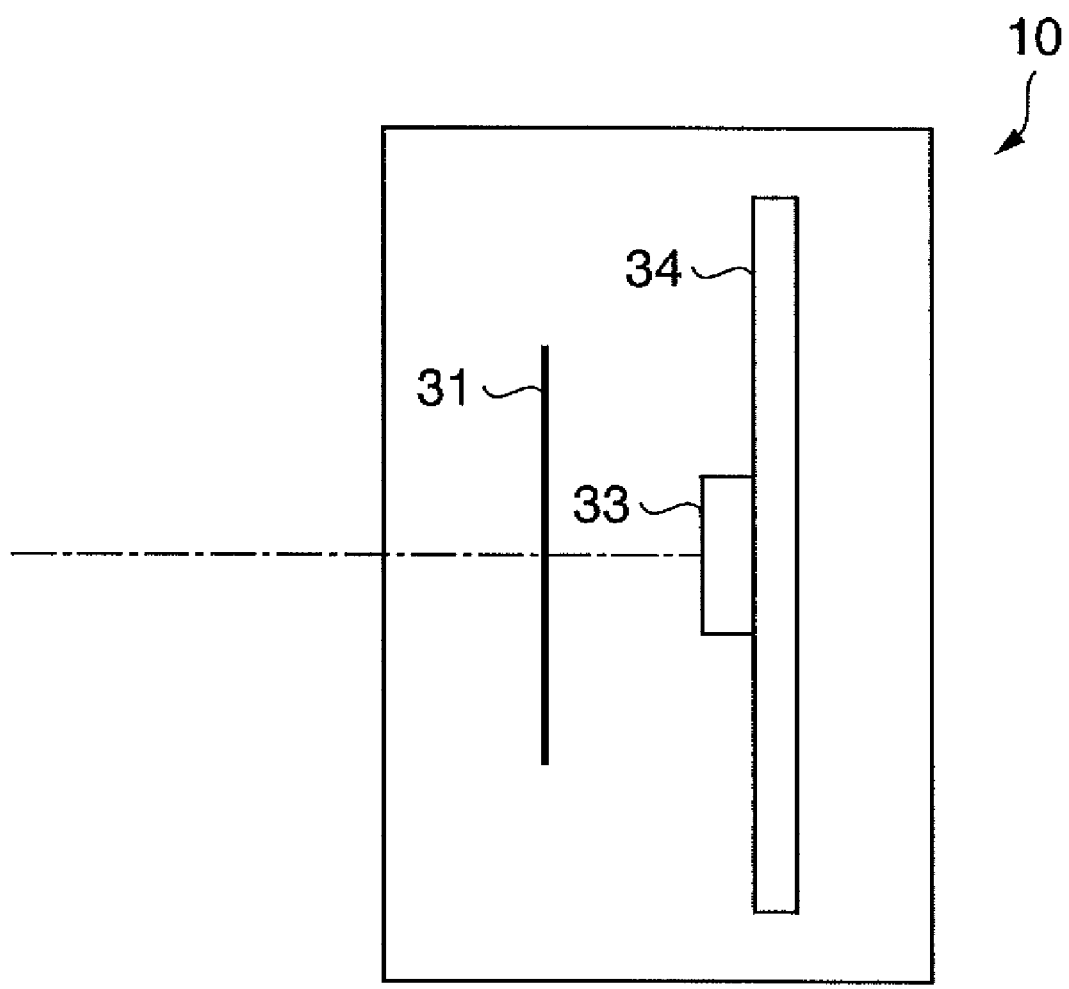
FIG. 5 is a schematic view of a focus sensor.

A mirror 26 and a focus sensor 10 are provided near the laser scanning end of the photosensitive drum 30. As shown in FIG. 5, the focus sensor 10 includes a slit plate 31, a photodiode 33, and an electric board 34 which converts an output from the photodiode 33 into a voltage.

Figure 6:
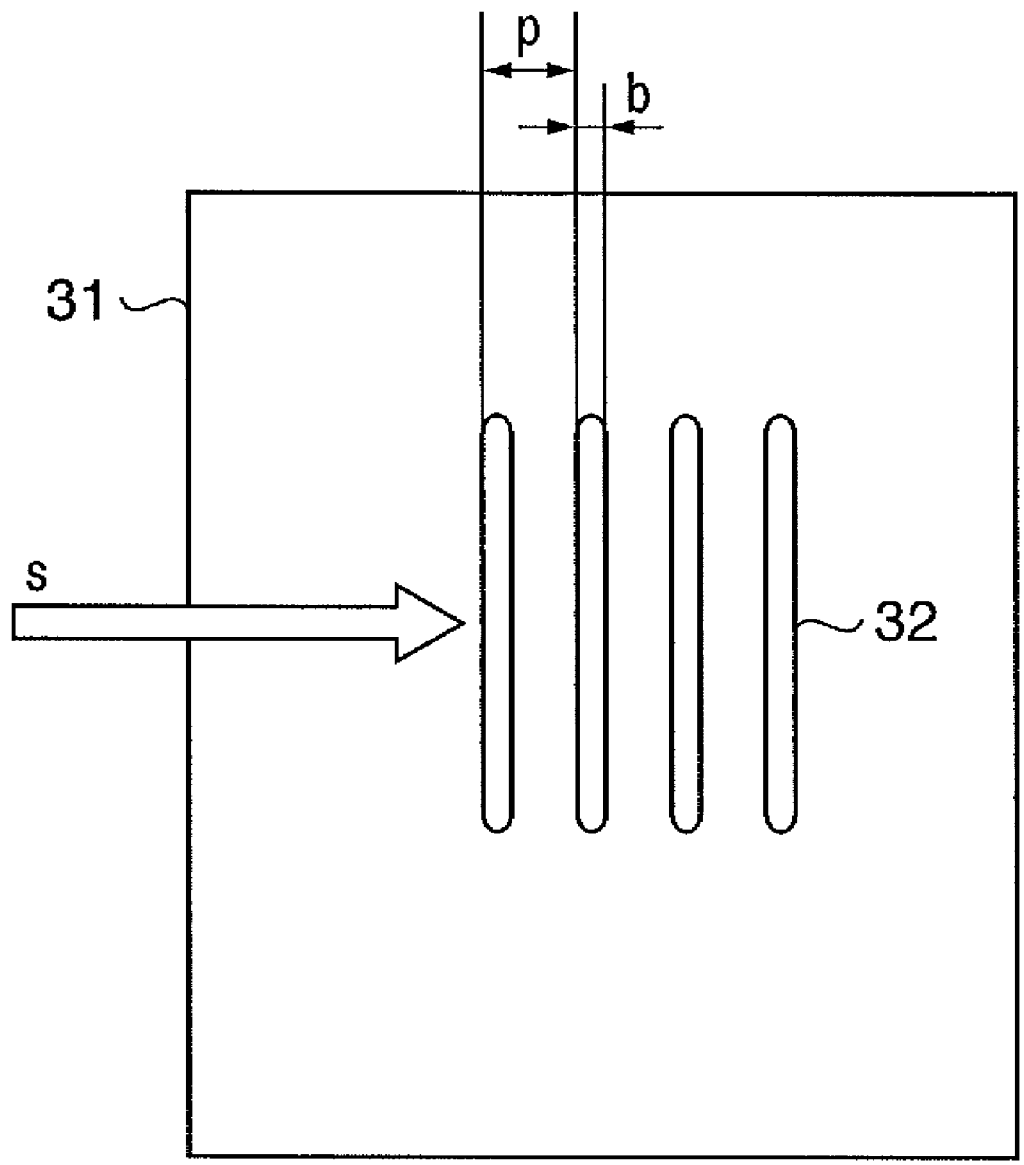
FIG. 6 is a view for explaining the slit plate of the focus sensor.

As shown in FIG. 6, the slit plate 31 of the focus sensor 10 is obtained by forming a plurality of continuous slits 32 with width b=0.05 mm at pitch p=0.15 mm.

Figure 7:
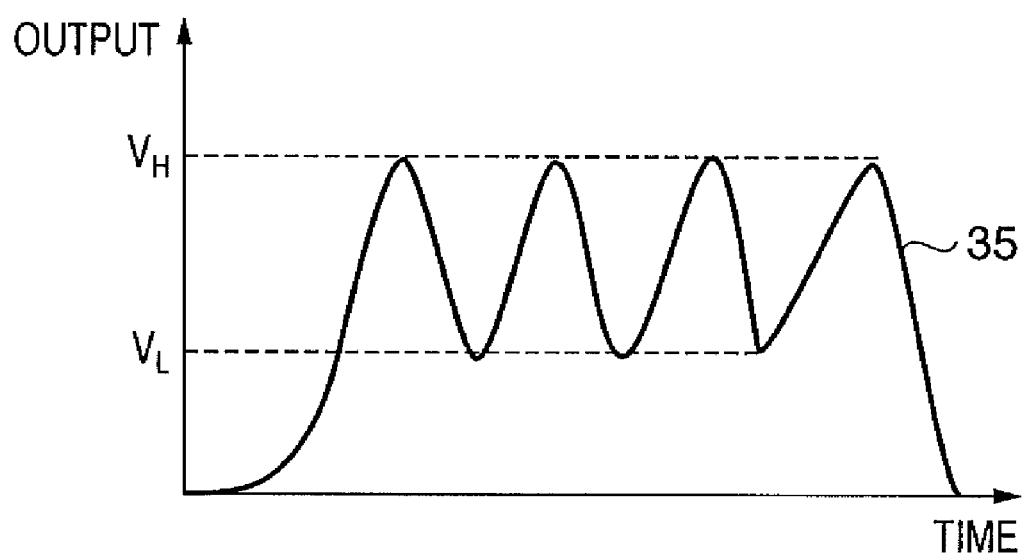
FIG. 7 is a graph showing the output waveform of the focus sensor.

An output 35 shown in FIG. 7 can be obtained by mounting the focus sensor 10 at a beam image formation position corresponding to the surface of the photosensitive drum 30 and scanning a laser beam. In this case, the output 35 exhibits that at the beam waist of a laser beam, the difference between VH and VL becomes maximum when the light amount output from the laser is constant, and the value of VH also becomes maximum.

According to the laser scanning apparatus 12, a slight variation in the relative interval between the semiconductor laser 8 and the collimator lens 6 leads to a large variation in the beam waist position of the image plane. For this reason, this embodiment uses a light source unit 13 integrally comprising the laser drive board 22, the semiconductor laser 8, the aperture 5, the electro-optical element 1, and the collimator lens 6.

Figure 3:
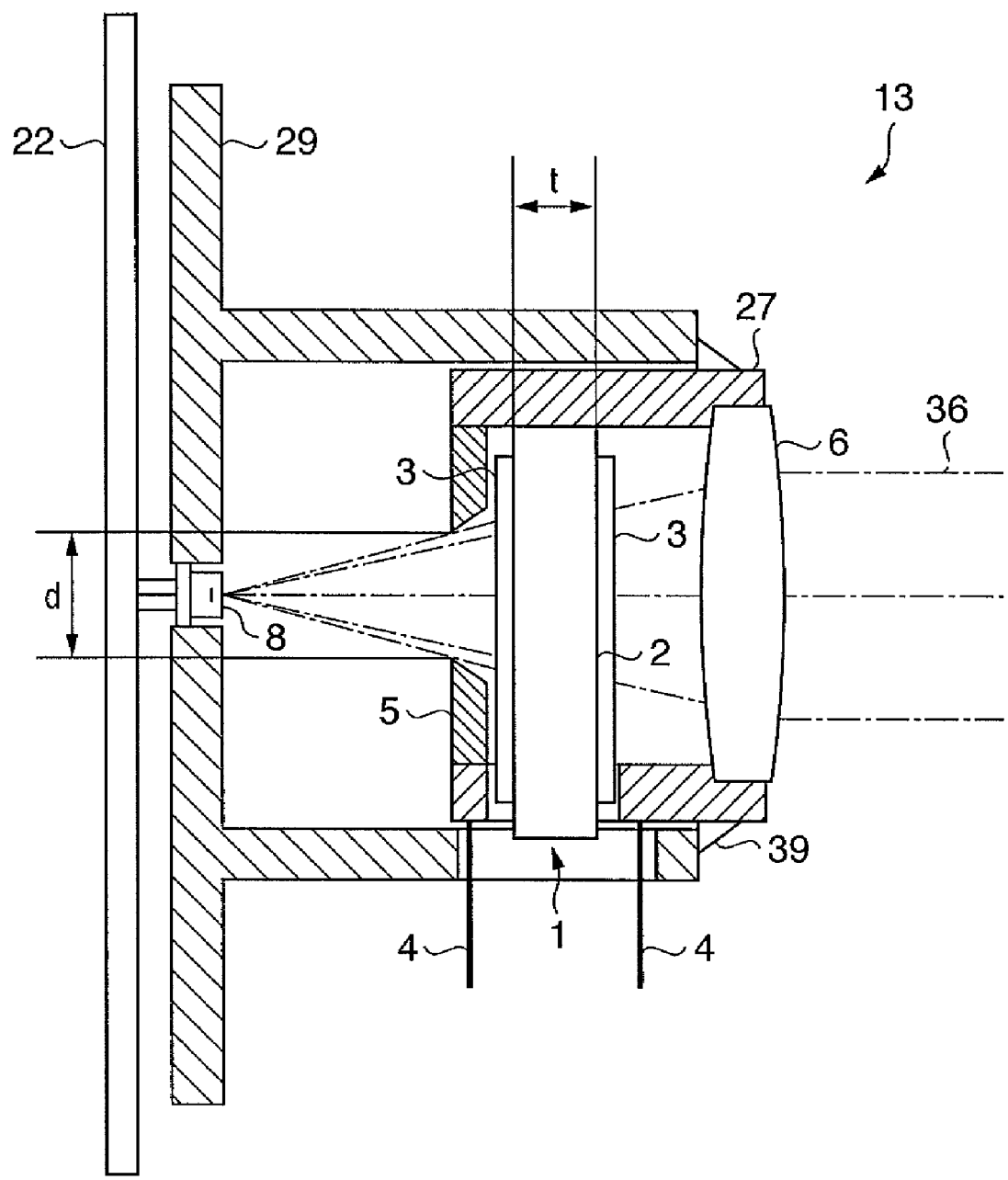
FIG. 3 is a schematic sectional view of a light source unit.

As shown in FIG. 3, the light source unit 13 has the collimator lens 6 fixed to a lens barrel 27. The interval between the collimator lens 6 and the semiconductor laser 8 pressed into a laser holder 29 is adjusted to collimate a light beam 36 by displacing the lens barrel 27 with respect to the laser holder 29 in the optical axis direction.

After this adjustment, the lens barrel 27 is fixed to the laser holder 29 with a UV adhesive 39. In the lens barrel 27, the electro-optical element 1 and aperture 5 whose surface on the semiconductor laser 8 side is matted and blacked are integrally fixed.

Figure 4A:
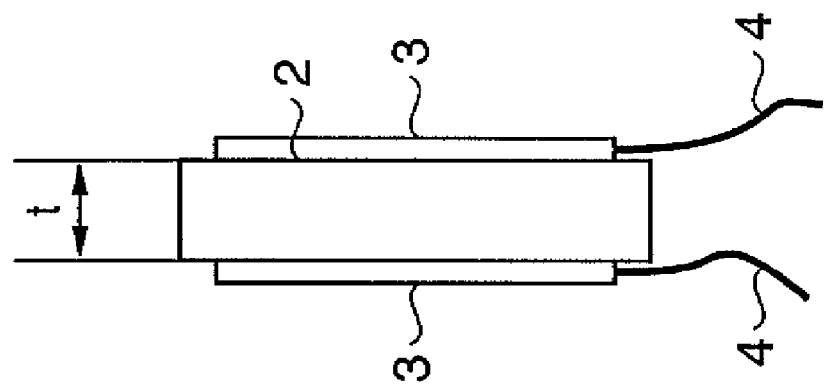
FIG. 4A is a perspective view of an electro-optical element when viewed from the optical axis direction.
Figure 4B:
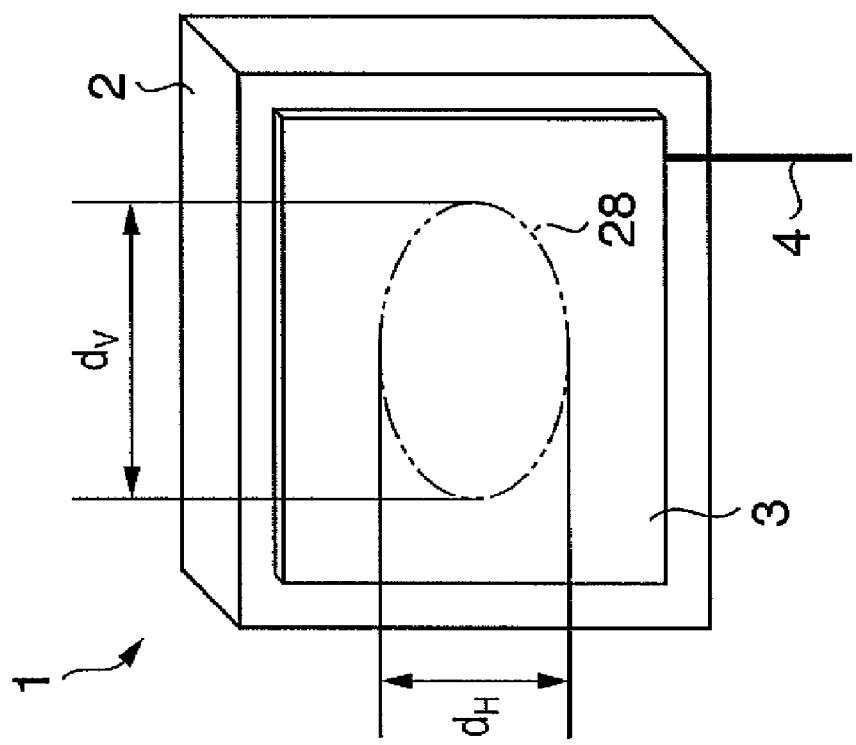
FIG. 4B is a side view of FIG. 4A.

The electro-optical element 1 will be described with reference to FIGS. 4A and 4B. FIG. 4A is a perspective view of the electro-optical element when viewed from the optical axis direction. FIG. 4B is a side view of FIG. 4A.

As shown in FIGS. 4A and 4B, the electro-optical element 1 has transparent conductive films 3 respectively formed on almost the entire areas of surfaces, of an electro-optical crystal 2 in the form of a flat plate with thickness t=5 mm, which face each other in the optical axis direction, and conductive cables 4 electrically connected to the respective transparent conductive films 3.

When the conductive cables 4 are connected to a voltage controllable power supply and a voltage is applied to the transparent conductive films 3, an electric field is applied to the electro-optical crystal 2. As a result, the refractive index of the electro-optical crystal 2 changes due to a so-called electro-optical effect.

In addition, the electro-optical crystal 2 can be quickly controlled at 100 kHz or higher by controlling the voltage to be applied to the transparent conductive films 3, and has sufficient properties for beam waist adjustment for each line scanning operation of the laser scanning apparatus 12.

Although a material for the electro-optical crystal 2 is not specifically limited, it is preferable to use lithium niobate, KTN ($KTaNbO_3$: potassium tantalate niobate), or the like as a material with a high electro-optical coefficient.

In this embodiment, the electro-optical crystal 2 whose refractive index changes by $2.5 \times 10^{-3}$ with an electric field of 100 V/mm is driven by a control voltage with a maximum rating of 100 V/mm. In the electro-optical crystal 2 with thickness t=5 mm, the maximum change in optical distance is 0.0125 mm.

According to the laser scanning apparatus 12 of this embodiment, since a variation in beam waist position is 150 times larger than a variation in the relative interval between the semiconductor laser 8 and the collimator lens 6, focus adjustment can be performed in the range of 1.875 mm.

In addition, according to this embodiment, since the aperture 5 is placed between the semiconductor laser 8 and the electro-optical element 1, even if the electro-optical element 1 is driven/controlled, the amount of a light beam formed into an image on the photosensitive drum 30 does not vary.

Figure 19:
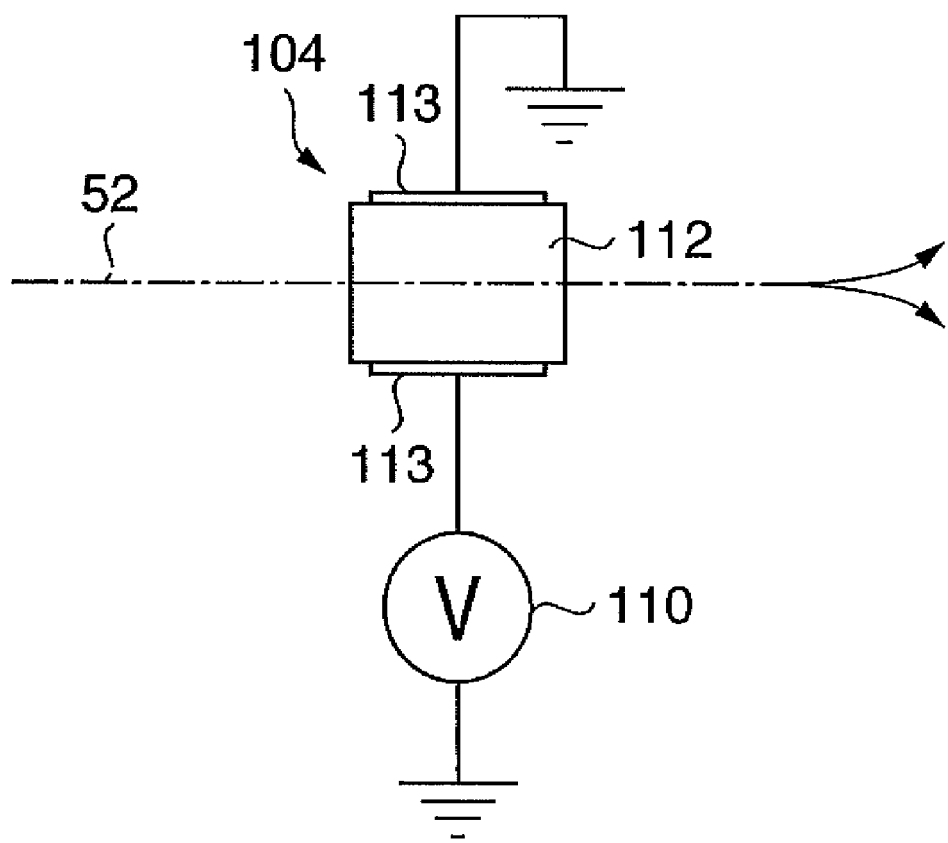
FIG. 19 is a view for explaining a conventional electro-optical element.

When an electric field is applied to the electro-optical crystal, a refractive index distribution becomes nonuniform in the direction of the electric field. This phenomenon is especially noticeable at an end portion of an electrode. For this reason, as shown in FIG. 19, when a laser beam is transmitted through the electro-optical crystal in a direction perpendicular to the electric field, the laser beam is distorted depending on the magnitude of a voltage applied to the electro-optical element. In addition, as indicated by the arrows in FIG. 19, a transmitted laser beam has the property of bending in the direction in which an electric field is applied.

In contrast to this, according to this embodiment, the transparent conductive films 3 which are sufficiently larger than the transmission area of a laser beam are placed in the optical axis direction in which a laser beam is transmitted through the electro-optical crystal 2, and a voltage is applied to the transparent conductive films 3. For this reason, the electro-optical crystal 2 exhibits a uniform refractive index change with respect to a laser beam, and hence a transmitted laser beam is not distorted. In addition, since an electric field is applied to the electro-optical crystal 2 in a direction parallel to the optical axis, a laser beam does not bend in the direction of an electric field.

As a transparent conductive film, for example, a film made of ITO (tin-doped indium oxide) or FTO (fluorine-doped tin oxide) which has good conductivity and light transmission characteristics or a composite conductive film made of them can be used. However, the material to be used is not specifically limited.

FIG. 8 shows an example of the measured data of image plane curvature in main scanning and sub scanning. In the example shown in FIG. 8, with regard to a main scanning image plane curvature 18 and a sub scanning image plane curvature 19, in the beam formation in the main scanning direction, in particular, curvature tends to occur at the beam waist position with a scanning position ±S1 being an apex.

Figure 9A:
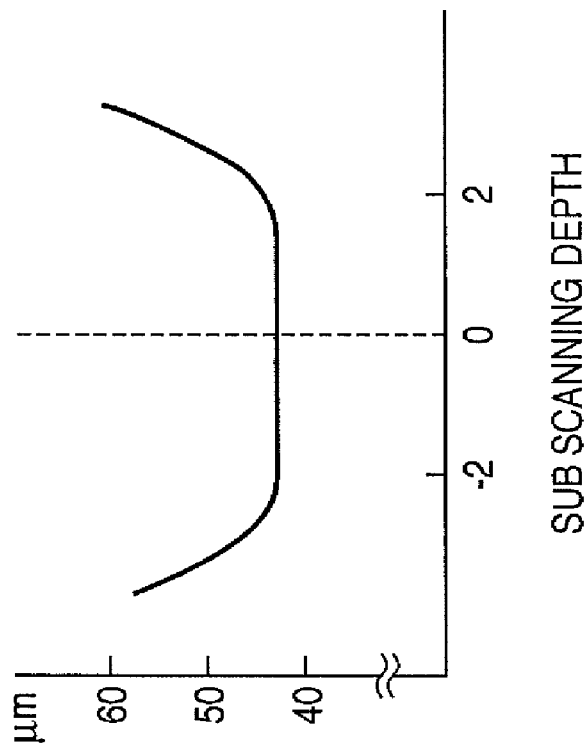
FIGS. 9A and 9B are graphs showing defocus characteristics.
Figure 9B:
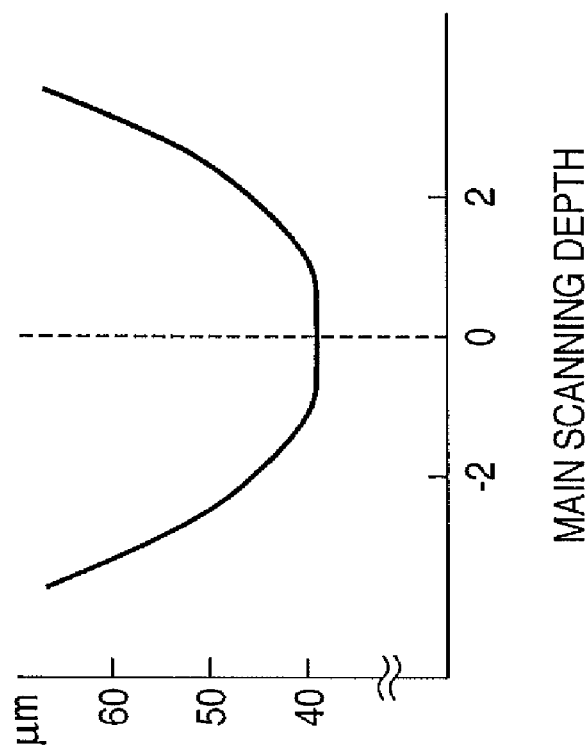

FIGS. 9A and 9B show so-called defocus characteristics when an image plane is defocused, and the shape of a spot on the image plane is formed into a spot diameter. As is obvious, the main scanning depth in FIG. 9A varies more sensitively than the sub scanning depth in FIG. 9B.

An example of the operation of the laser scanning apparatus 12 will be described next.

In this embodiment, beam waist position adjustment has the effect of correcting the beam waist positions in both main scanning and sub scanning, and mainly has the effect of correcting image formation in main scanning in which a change in spot profile is large with respect to image plane curvature and a variation in beam waist position. In adjusting a beam waist position, first of all, a beam waist position is measured and stored for each laser scanning unit, and the beam waist position is corrected every time an image is formed.

Figure 11:
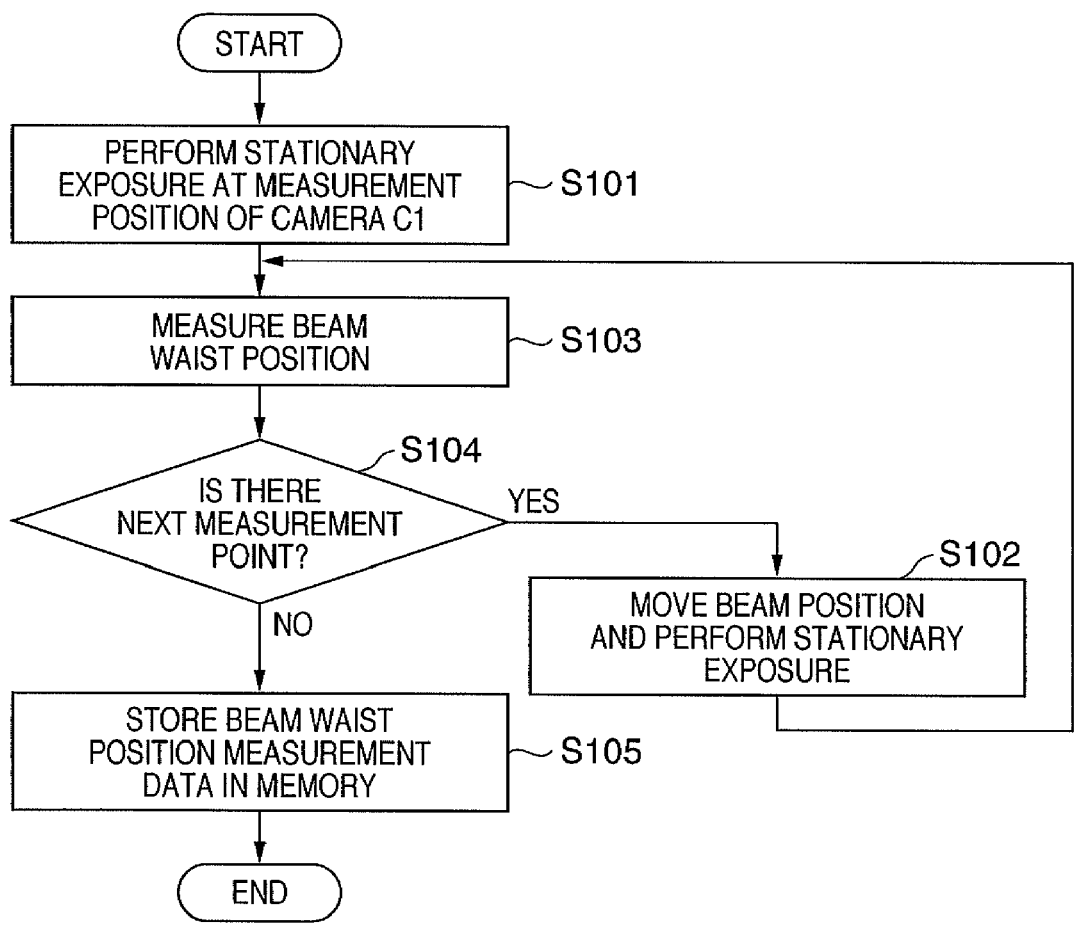
FIG. 11 is a flowchart for explaining a beam waist position measuring method and a method of storing the measurement result.

FIG. 11 is a flowchart for explaining a method of a beam waist position and a method of storing the measurement result. The measuring device shown in FIG. 13 measures a beam waist position. This measuring device has five CCD cameras 43 as C1 to C5 arranged side by side in the image plane scanning direction, with the CCD cameras 43 being mounted on independent linear stages 44.

Figure 13:
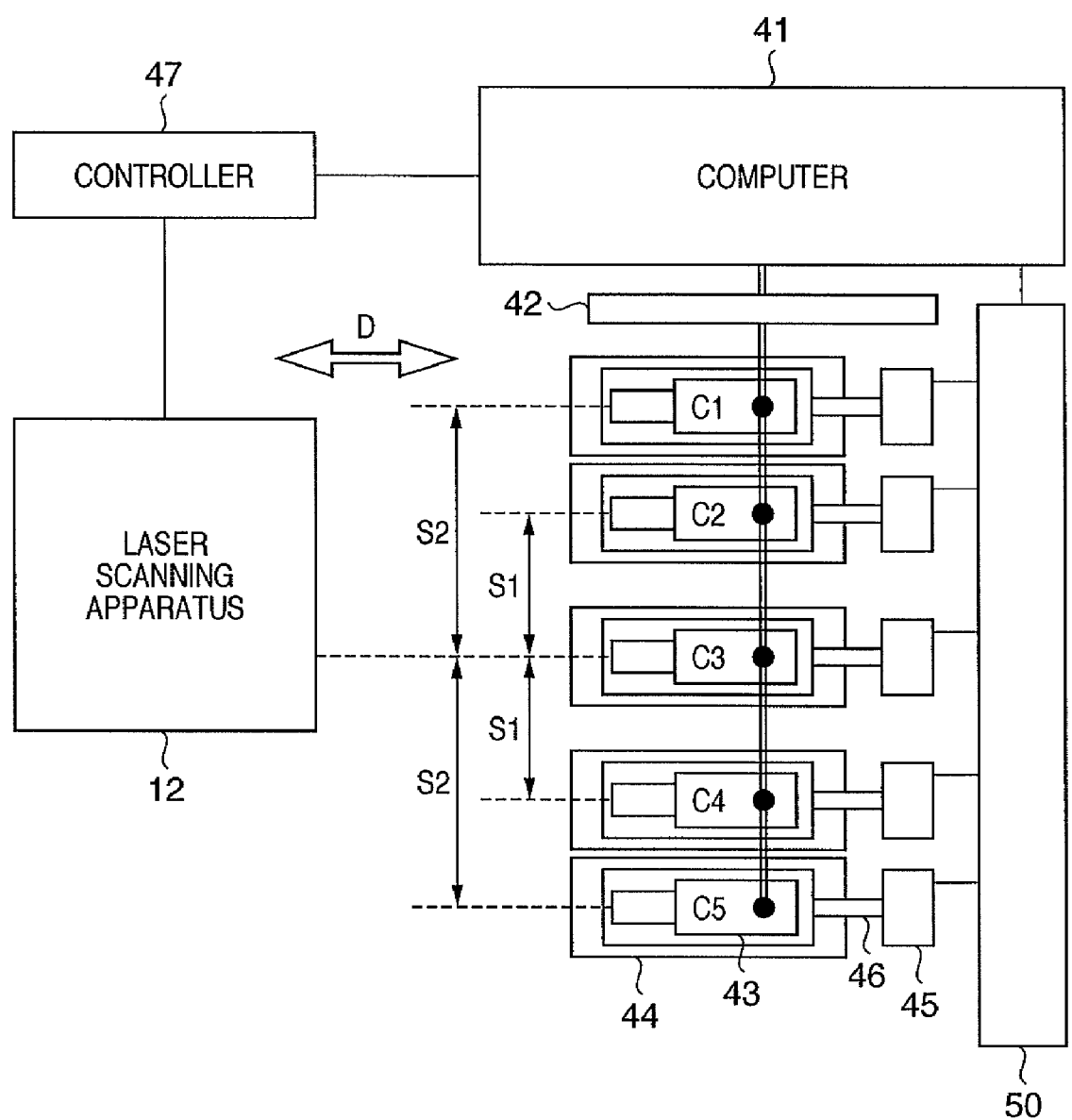
FIG. 13 is a view for explaining an example of a measuring device for measuring image plane curvature.

When a feed screw 46 is rotated/driven by controlling a pulse motor 45 through a drive board 50 in accordance with an instruction from a computer 41, the CCD camera 43 linearly moves with high accuracy in the arrow D direction in FIG. 13.

In addition, placing the CCD cameras 43 at scanning positions ±S1 and ±S2 shown in FIG. 8 and measuring the positions of ±S1 at which image plane curvature becomes noticeable, in particular, can accurately measure the image plane curvature with a small number of cameras. An image processing board 42 processes images captured by the CCD cameras 43. Referring to FIG. 13, reference numeral 47 denotes a controller which controls the laser scanning of the laser scanning apparatus 12 in accordance with an instruction from the computer 41 in image plane curvature measurement.

Referring back to FIG. 11, first of all, in step S101, the controller 47 continuously turns on the laser scanning apparatus 12 at the measurement point of the CCD camera 43 while the polygon mirror 15 is kept standstill.

The CCD camera 43 at the measurement point is moved in the arrow D direction in FIG. 13, and the beam waist position of the measurement point is measured (step S103). The polygon mirror 15 is then rotated through a necessary angle to perform stationary exposure of the measurement point of the CCD camera 43 as C2 (step S102).

The controller determines whether this processing is to be performed at the next measurement point (step S104), and measurement is repeated (steps S102 to S104). The beam waist position information of the five measured points is stored in a memory 23 of the laser drive board 22 (step S105).

Figure 12:
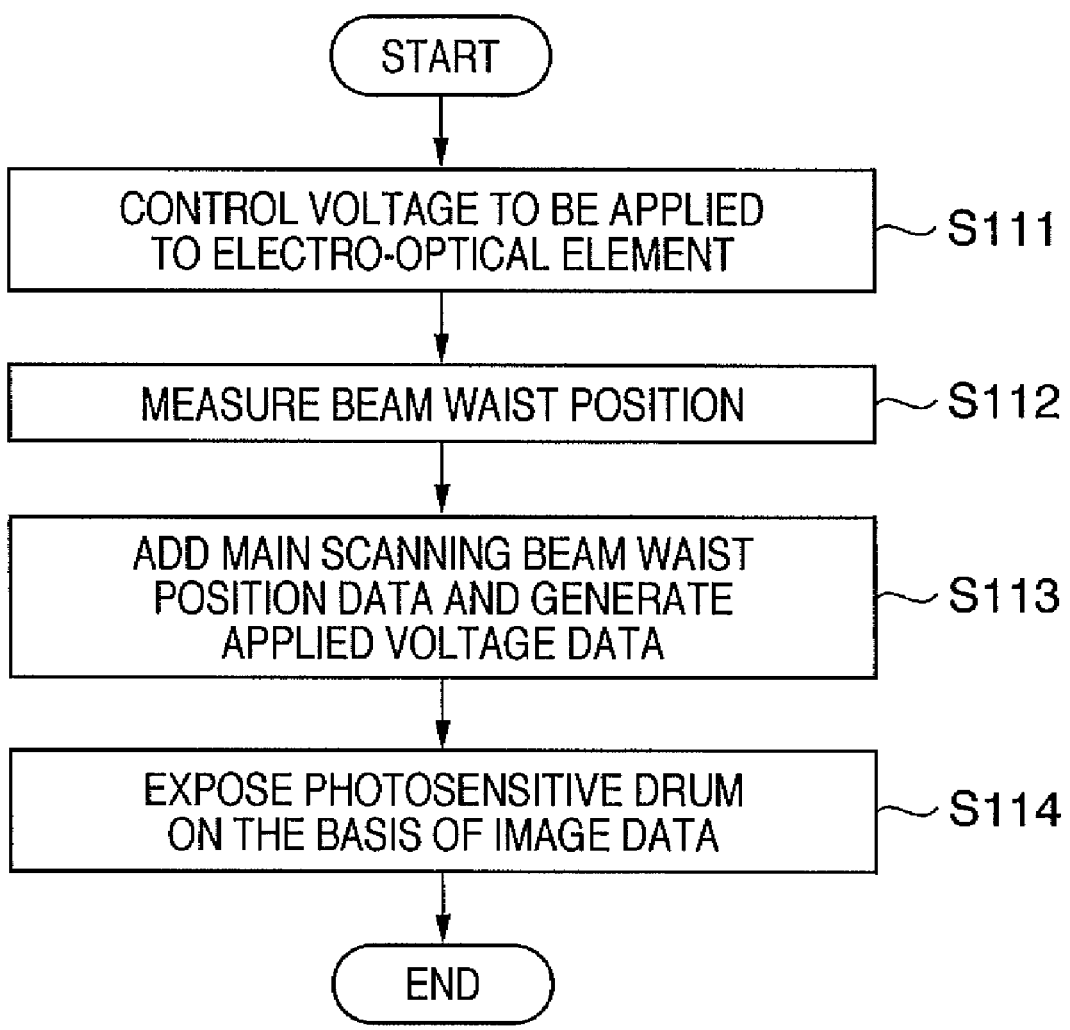
FIG. 12 is a flowchart for explaining a beam waist position correcting method.

The method of correcting a beam waist position will be described next with reference to FIG. 12. A main controller 20 in FIG. 2 performs beam waist position correction processing.

First of all, before exposure on the surface of the photosensitive drum 30, a control power supply 14 changes the voltage applied to the electro-optical element 1 stepwise while the polygon mirror 15 is rotated/driven at a predetermined rotational speed, and the BD sensor 9 and the focus sensor 10 are laser-scanned (step S111).

The main controller then measures a beam waist position from an applied voltage Vc by which an output voltage from the focus sensor 10 becomes maximum, and stores the measured position in a memory 38 in the main controller 20 (step S112).

The main controller adds the beam waist position data of five scanning positions stored in the memory 23 in the laser drive board 22 to the beam waist position data in step S38, and approximates to the profile curve of continuous beam waist positions with respect to the scanning position shown in FIG. 8.

The main controller 20 then calculates applied voltage data for the electro-optical element 1 by which this curve becomes linear and matches the surface of the photosensitive drum 30 (step S113).

The photosensitive drum 30 is exposed on the basis of the image data 21 while a voltage is repeatedly applied to the electro-optical element 1 in accordance with the above applied voltage data with reference to a signal from the BD sensor 9 (step S114). This makes it possible to perform exposure on the surface of the photosensitive drum 30 with an almost optimal and uniform spot.

FIGS. 10A and 10B respectively show a spot shape (this embodiment) at a beam waist position and a spot shape (prior art) at a non-beam waist position where the spot changes. FIG. 10C shows main scanning sections of these spots.

When the spot changes in the prior art in FIG. 10B, the peak light amount decreases, and the resultant spot shape tends to expand laterally. In this embodiment in FIG. 10A, since the beam waist is reproduced in the entire scanning area, a uniform spot is obtained.

This makes it possible to implement stable, fast beam waist position adjustment by using a simple lens arrangement without causing any variation in the light amount profile of a spot on an image plane.

A laser scanning apparatus according to the second embodiment of the present invention will be described next with reference to FIGS. 14A to 17.

Figure 14A:
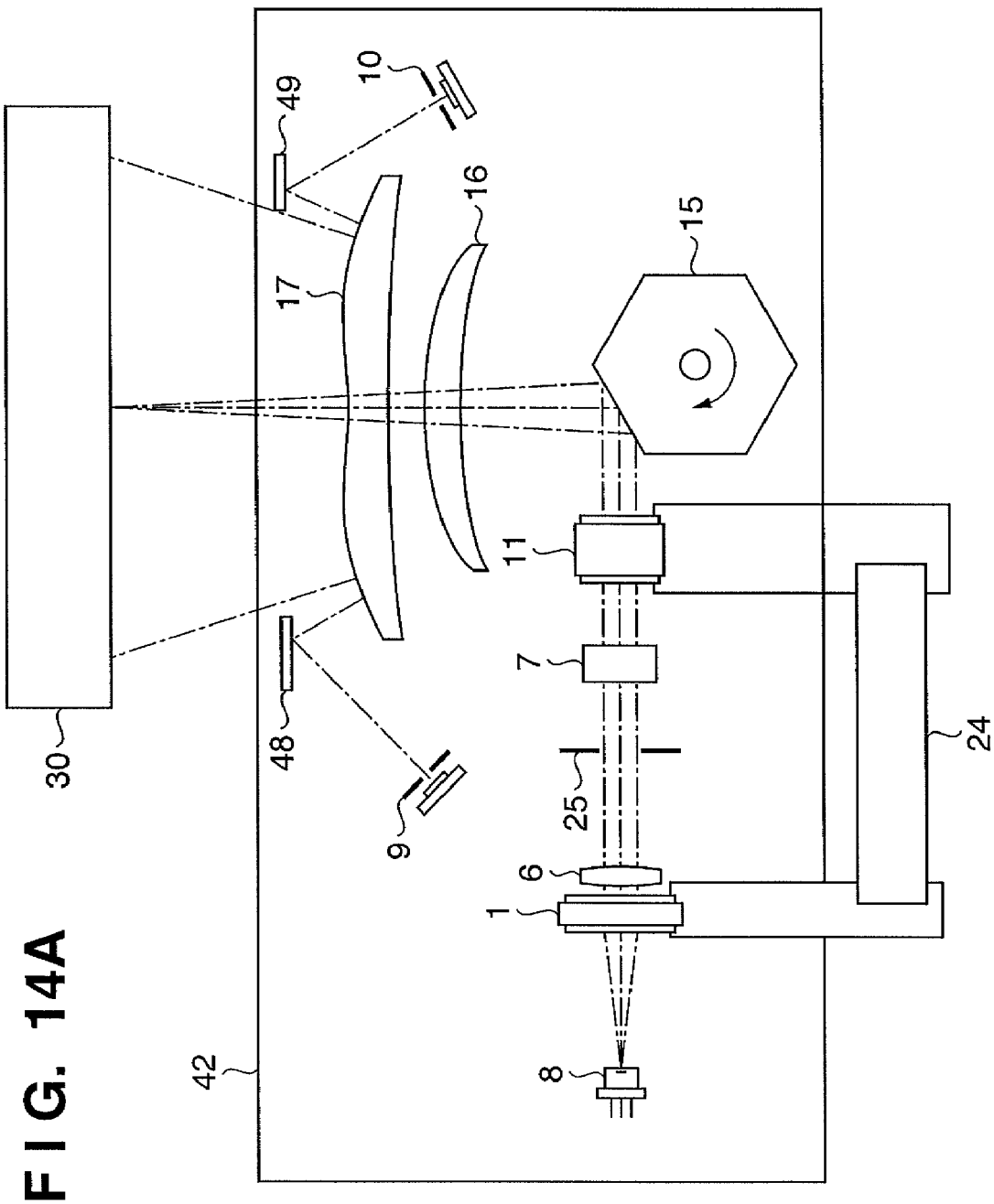
FIG. 14A is a plan view of a laser scanning apparatus according to the second embodiment of the present invention.
Figure 15:
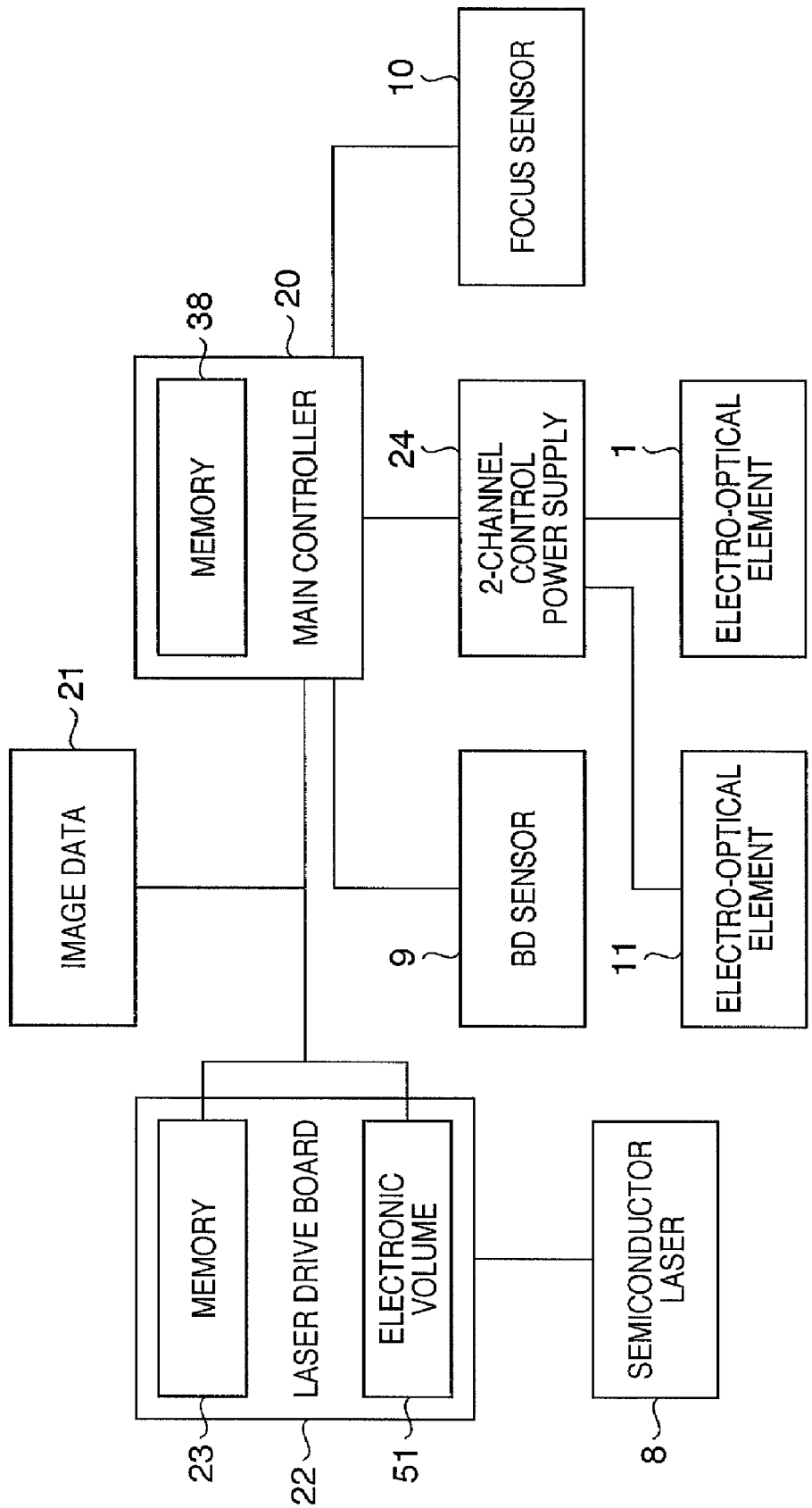
FIG. 15 is a block diagram showing a control mechanism for the laser scanning apparatus shown in FIG. 14A.

FIG. 14A is a plan view of the laser scanning apparatus according to the second embodiment of the present invention. FIG. 14B is a sectional view of an optical path from a semiconductor laser 8 to a polygon mirror 15. FIG. 15 is a block diagram showing a control mechanism for the laser scanning apparatus shown in FIG. 14A. The same reference numerals as in the first embodiment denote the same or corresponding parts in the second embodiment, and a repetitive description will be simplified or omitted.

As shown in FIG. 14A, a laser scanning apparatus 42 of this embodiment has an electro-optical element 11 placed between a cylindrical lens 7 and the polygon mirror 15 to allow adjustment of a beam waist position in the sub scanning direction as compared with the first embodiment.

In addition, an electro-optical element 1 is tiltably placed to prevent a laser beam reflected by the electro-optical element 1 from returning to the semiconductor laser, and an aperture 25 is placed for a collimated light beam after being transmitted through a collimator lens 6. In addition, providing a focus sensor 10 within the laser scanning apparatus 42 makes it possible to perform measurement within the laser scanning apparatus 42.

Like the electro-optical element 1, the electro-optical element 11 has transparent conductive films 3 formed on almost the entire areas of surfaces of an electro-optical crystal 2 which face each other in the optical axis direction, and conductive cables 4 electrically connected to the respective transparent conductive films 3. In addition, in order to apply controllable voltage to the two electro-optical elements 1 and 11, the conductive cables 4 of the electro-optical elements 1 and 11 are connected to a 2-channel control power supply 24.

This embodiment adjusts beam waist positions in main scanning and sub scanning. Unlike the first embodiment, the second embodiment stores a set light amount as an output value from the focus sensor 10 and light amount correction is performed after beam waist positions in main scanning and sub scanning are corrected because the light amount varies accompanying the adjustment of beam waist positions.

Figure 16:
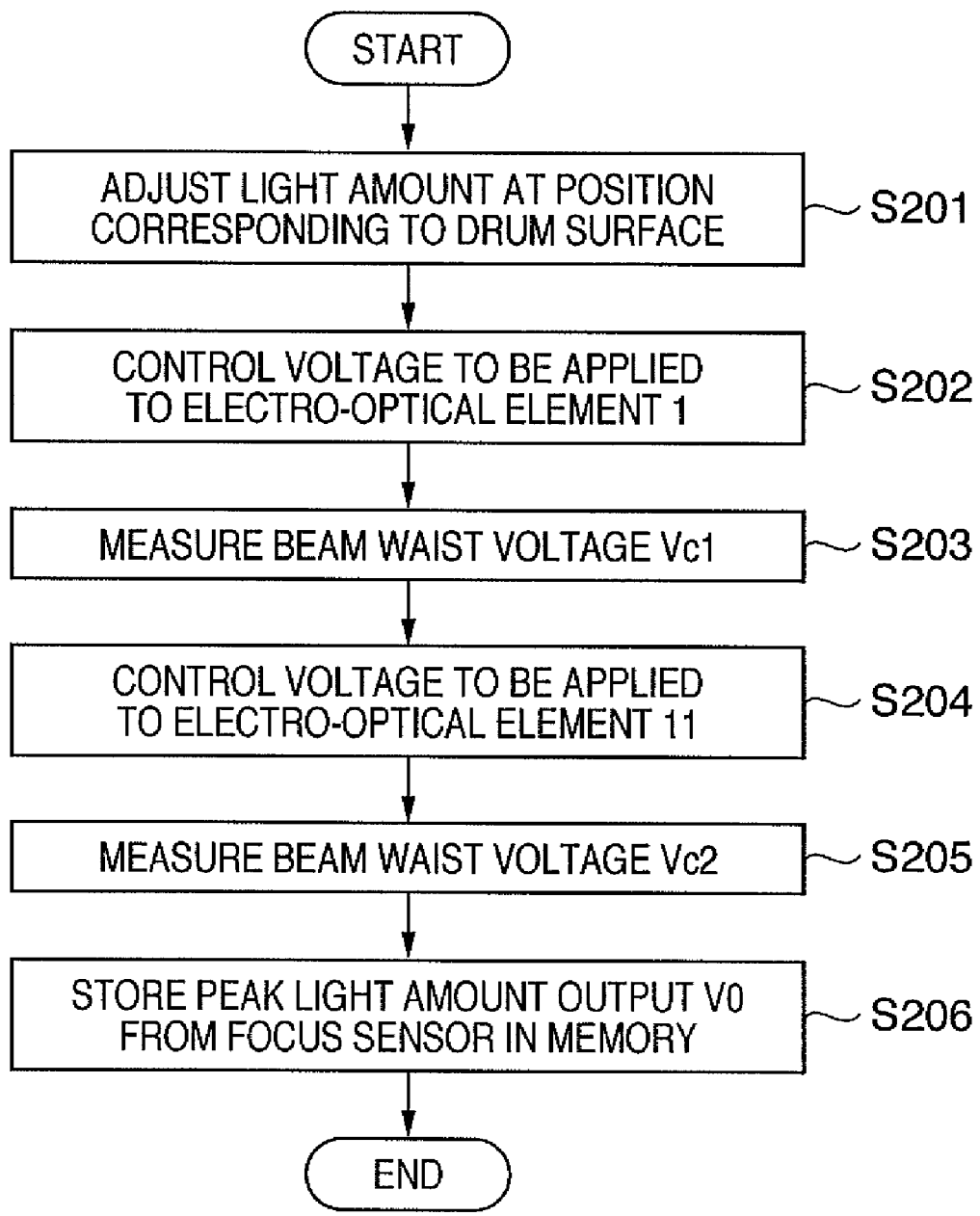
FIG. 16 is a flowchart for explaining light amount setting for a focus sensor.

FIG. 16 is a flowchart for explaining light amount setting for the focus sensor 10.

First of all, a controller 47 controls an electronic volume 51 in a laser drive board 22 to set a light amount value at a corresponding position on the surface of the photosensitive drum 30 to a predetermined light amount value by using the measuring device shown in FIG. 13, thereby adjusting the light amount output of the laser (step S201).

The controller then changes stepwise the voltage to be applied to the electro-optical element 1 while rotating/driving the polygon mirror 15 at a predetermined rotational speed and scanning a laser on only the BD sensor 9 and the focus sensor 10 (step S202). The controller measures an applied voltage Vc1 at which the light amount of the focus sensor 10 becomes maximum, and sets an output for the control power supply 24 of a main controller 20 (step S203).

Likewise, the controller changes stepwise the voltage to be applied to the electro-optical element 11 (step S204), measures an applied voltage Vc2 at which the light amount of the focus sensor 10 becomes maximum, and sets an output for the control power supply 24 of the main controller 20 (step S205).

A peak output V0 of the focus sensor in this state is stored in a memory 23 of the laser drive board 22 (step S206).

Figure 17:
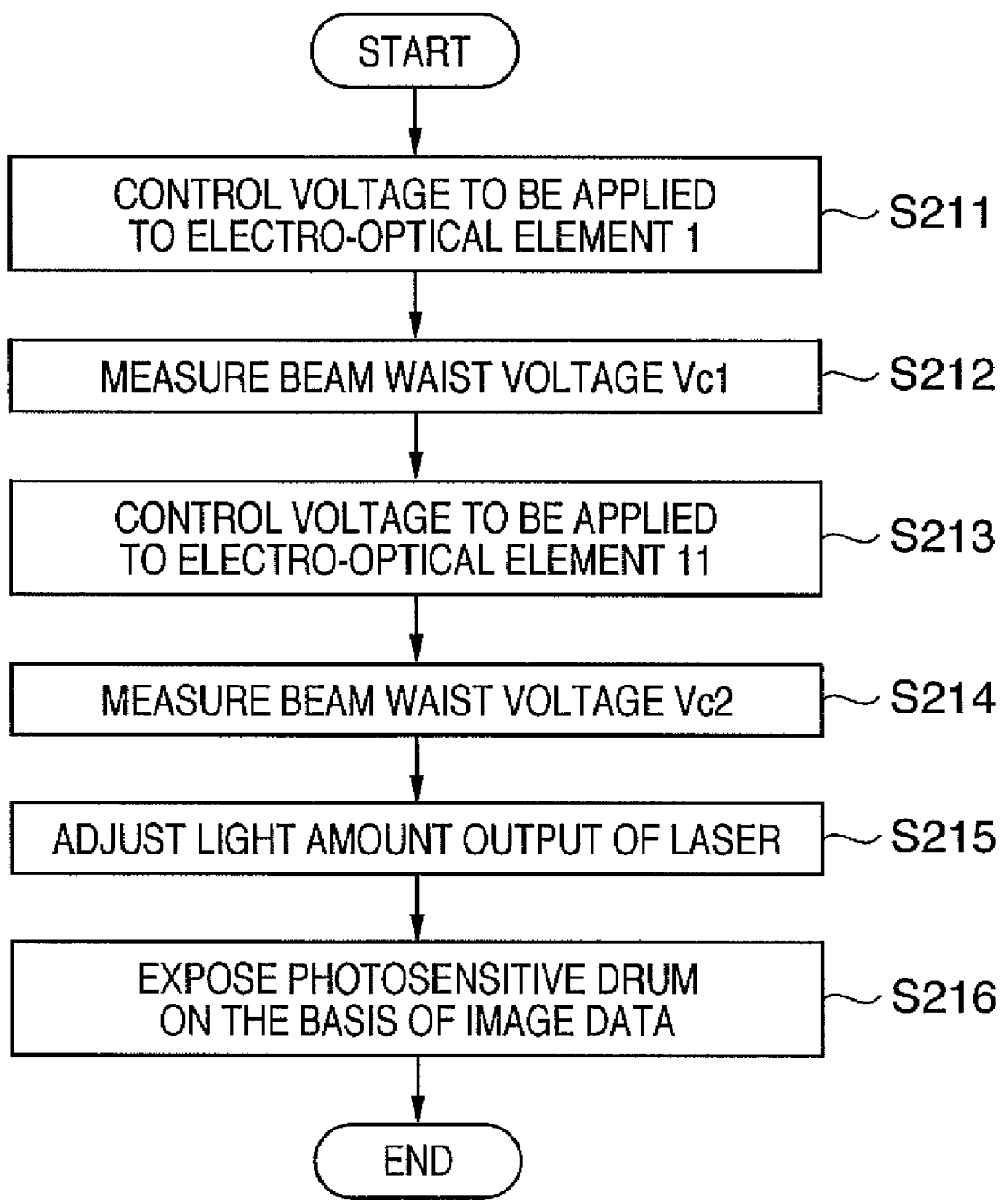
FIG. 17 is a flowchart for explaining correction for a beam waist position.
Figure 18A:
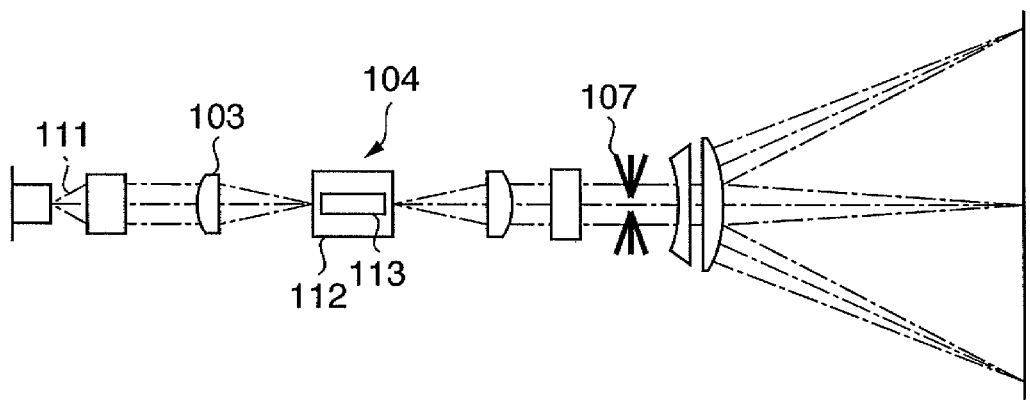
FIG. 18A is a plan view showing an example of a conventional laser scanning apparatus.
Figure 18B:
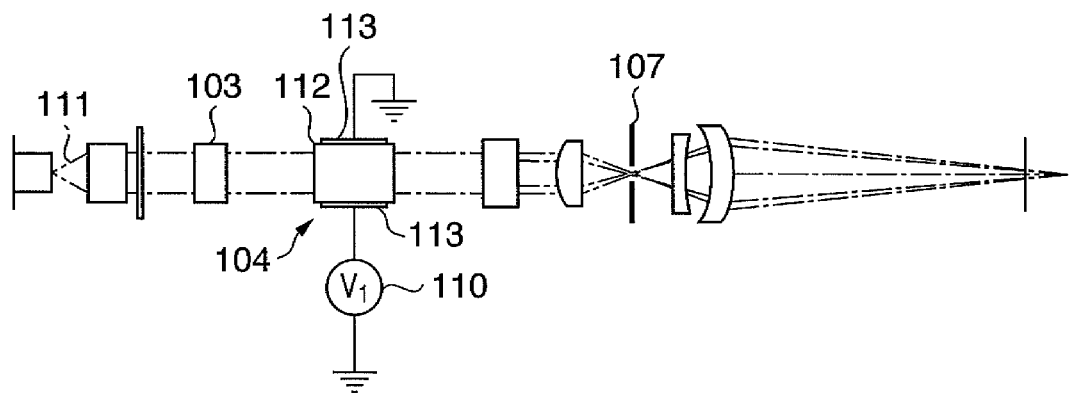
FIG. 18B is a front view of the apparatus.

FIG. 17 is a flowchart for explaining beam waist position correction. This processing is executed under the control of the main controller 20.

First of all, the main controller changes stepwise the voltage to be applied to the electro-optical element 1 while rotating/driving the polygon mirror 15 at a predetermined rotational speed and scanning the laser on only a BD sensor 9 and the focus sensor 10 (step S211). The main controller then measures the applied voltage Vc1 at which the light amount of the focus sensor 10 becomes maximum, and sets an output for the control power supply 24 of the main controller 20 (step S212).

The main controller then changes stepwise the voltage to be applied to the electro-optical element 11 (step S213). Likewise, the main controller measures the applied voltage Vc2 at which the light amount of the focus sensor 10 becomes maximum, and sets an output for the control power supply 24 of the main controller 20 (step S214).

The main controller controls the electronic volume 51 in the laser drive board 22 to set the peak output of the focus sensor 10 to the output V0 stored in the memory 23 in the laser drive board 22, thereby adjusting the light amount output of the laser (step S215). Subsequently, the main controller exposes the surface of the photosensitive drum 30 on the basis of image data 21 with reference to a signal from the BD sensor 9 (step S216). This makes it possible to perform exposure upon correcting beam waist positions in main scanning and sub scanning.

The present invention is not limited to the above embodiments, and various changes and modifications can be made within the spirit and scope of the present invention.

For example, the above embodiments have exemplified the polygon mirror as a deflector. However, the present invention is not limited to this, and may use, for example, a deflector comprising a mirror which reciprocally rotates/vibrates, a deflector which deflects and scans with an electro-optical element or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-355159, filed Dec. 28, 2006, which is hereby incorporated by reference herein in its entirety.

What is claimed is:

1. A light beam scanning apparatus including a light source configured to emit a diffusing light beam, and a deflector configured to deflect the light beam so that the light beam scans a photosensitive member, the apparatus comprising:

an electro-optical element including an electro-optical crystal which inputs the light beam incident from said light source, and a pair of electrodes for applying a voltage to the electro-optical crystal;

a first detecting unit mounted on a position corresponding to the surface of the photosensitive member, and configured to detect the light beam deflected and scanned by the deflector to detect a beam waist position;

a second detecting unit configured to detect the light beam deflected and scanned by the deflector to control timing in which the light source emits the light beam;

a storage unit configured to store first beam waist position data of a predetermined number of scanning positions in a main scan line, wherein the first beam waist position data indicates image plane curvature and is obtained by performing a stationary exposure and measuring a beam waist position at each of the predetermined number of scanning positions;

an obtaining unit configured to obtain second beam waist position data of the main scan line by performing the scan for the main scan line while changing the voltage applied to the electro-optical crystal, and measuring a beam waist position from an applied voltage by which an output voltage from the first detecting unit becomes maximum;

a generation unit configured to generate applied voltage data for the electro-optical crystal by adding the first beam waist position data to the second beam waist position data so that the applied voltage data reflects the image plane curvature; and an exposure unit configured to expose the photosensitive member while controlling the voltage applied to the electro-optical crystal based on the applied voltage data generated by the generation unit.

2. The apparatus according to claim 1, further comprising:
a collimator lens configured to collimate the diffusing light beam incident from the electro-optical crystal and emit the collimated light beam to the deflector, wherein said light source, said electro-optical element, and said collimator lens are provided as an integrated unit stationary installed in the apparatus.

3. The apparatus according to claim 1, wherein the pair of electrodes comprises transparent electrodes respectively provided on an incident surface and an emitting surface of the electro-optical crystal.

4. The apparatus according to claim 1, wherein the electro-optical element is tiltably placed with respect to an optical axis.

* * * * *